United States Patent [19]

Rashleigh

[11] Patent Number: 5,265,449
[45] Date of Patent: Nov. 30, 1993

[54] SNOWMOBILE TRACK LOCK

[75] Inventor: Rodney W. Rashleigh, Rexdale, Canada

[73] Assignee: E-Z Traxx Inc., Etobicoke, Canada

[21] Appl. No.: 974,229

[22] Filed: Nov. 10, 1992

[51] Int. Cl.$^5$ .................... B62D 55/205; E05B 25/00
[52] U.S. Cl. ................................. 70/18; 70/58;
70/226; 70/233; 70/236; 70/237; 180/190; 305/35 EB
[58] Field of Search ................. 70/14, 18, 57, 58, 225, 70/226, 233, 236, 237; 180/190; 305/35 EB

[56] References Cited

U.S. PATENT DOCUMENTS

| 543,547 | 7/1895 | Geistwite | 70/236 |
| 4,019,354 | 4/1977 | O'Dell | 70/18 X |
| 4,409,804 | 10/1983 | Sork | 70/236 X |
| 4,768,359 | 9/1988 | Wade | 70/14 |
| 4,896,519 | 1/1990 | Pitts | 70/18 X |

FOREIGN PATENT DOCUMENTS 3671 of 1899 United Kingdom ............... 70/236
2120190 11/1983 United Kingdom ............... 70/233

Primary Examiner—Lloyd A. Gall
Attorney, Agent, or Firm—Donald E. Hewson

[57] ABSTRACT

An anti-theft device for use in conjunction with a tracked snowmobile is disclosed. The device has an elongated main arm member and an auxiliary arm member welded to the main arm member, with the arm members being made of case hardened steel and then being plastic coated. The two arm members are substantially parallel with a bight therebetween that is adapted to receive the track of the snowmobile. The device fits across the track of a snowmobile between adjacent tread members and is locked in place on the track by a conventional lock that fits through co-operating apertures in the arm members. The ends of the arm members comprise blocking means that are adapted to physically engage a portion of the body of the snowmobile so as to substantially preclude relative movement of the track with respect to the body of the snowmobile, thereby to preclude the snowmobile from being driven.

15 Claims, 2 Drawing Sheets

SNOWMOBILE TRACK LOCK

FIELD OF THE INVENTION

This invention relates to physical locking mechanisms for vehicles, and more particularly to interference type locking mechanisms for snowmobiles.

BACKGROUND OF THE INVENTION

Snowmobiles are very commonly used for transportation during winter months in climates where weather conditions permit. Such vehicles typically have a powered track having a tread thereon that is adapted to grip snow and the like. Snowmobiles are typically fairly small and lightweight, for carrying one or two persons thereon, and are generally open to the air. Resultingly, the engine, the electrical system, and so on, are quite accessible to anyone.

Since it is common to leave a snowmobile unattended, either at home when stored away, or perhaps when in the wilderness while hunting or fishing, there is very often ample opportunity for an unauthorized person to gain access to a snowmobile in order to steal it. Although snowmobiles are large and heavy enough to make it difficult to carry them away, it is relatively easy to access the electrical system and start the engine, even without the key to the ignition.

It has been found that an ever increasing number of snowmobiles are being stolen. The most common method of theft is "hot-wiring" the electrical system and driving the snowmobile away. In order to make the electrical system more difficult to access, a complete redesign of the snowmobile cowling and placement of the electrical system therein would be necessary. While this may be a possible long term solution, it is obviously not a solution that is presently usable. What is required is a device that precludes a snowmobile from being driven away unwantedly.

PRIOR ART

There is no known prior art that physically locks a snowmobile so that it cannot be driven even if the engine is turned on. The only known method presently used is to chain the snowmobile to a tree or to another snowmobile, which is not overly effective since chains can fairly readily be cut with suitable cutting equipment.

SUMMARY OF THE INVENTION

It is an object of the present invention to provide a device that precludes the theft of snowmobiles.

It is a further object of the present invention to preclude snowmobiles from being unwantedly driven.

It is another object of the present invention to provide a device that precludes a snowmobile from being stolen by physically interfering with the drive track of the snowmobile.

It is another object of the present invention to provide a device that precludes a snowmobile from being stolen by physically interfering with the drive track of the snowmobile, while not damaging the drive mechanism or cooling system of the snowmobile.

It is yet another object of the present invention to provide a device to preclude a snowmobile from being stolen, which device is highly resistant to being broken or cut and unwantedly removed from the snowmobile.

A device for use in conjunction with a tracked snowmobile, for locking the track of the snowmobile with respect to the body of the snowmobile, is disclosed. The device comprises an elongated main arm member having first and second generally opposed ends, with the main arm member adapted to engage a portion of the track of the tracked snowmobile and to extend substantially across the width thereof, a first blocking means at the first end of the elongated main arm member, a second blocking means at the second end of the elongated main arm member. A retaining means is connected to the elongated main arm member and is adapted to retain the elongated main arm member in engagement with the track. There is a lock receiving means provided that is adapted to accept a lock means that locks the retaining means with respect to the elongated main arm member, and thereby lock the elongated main arm member in engagement with the track. The first and second blocking means are adapted to physically engage a portion of the body of the tracked snowmobile so as to substantially preclude relative movement of the track with respect to the portion of the body, thereby to preclude the tracked snowmobile from being driven.

BRIEF DESCRIPTION OF THE DRAWINGS

Embodiments of the present invention will now be described by way of the accompanying drawings, in which.

DETAILED DESCRIPTION OF THE PREFERRED EMBODIMENTS

Figure 1:
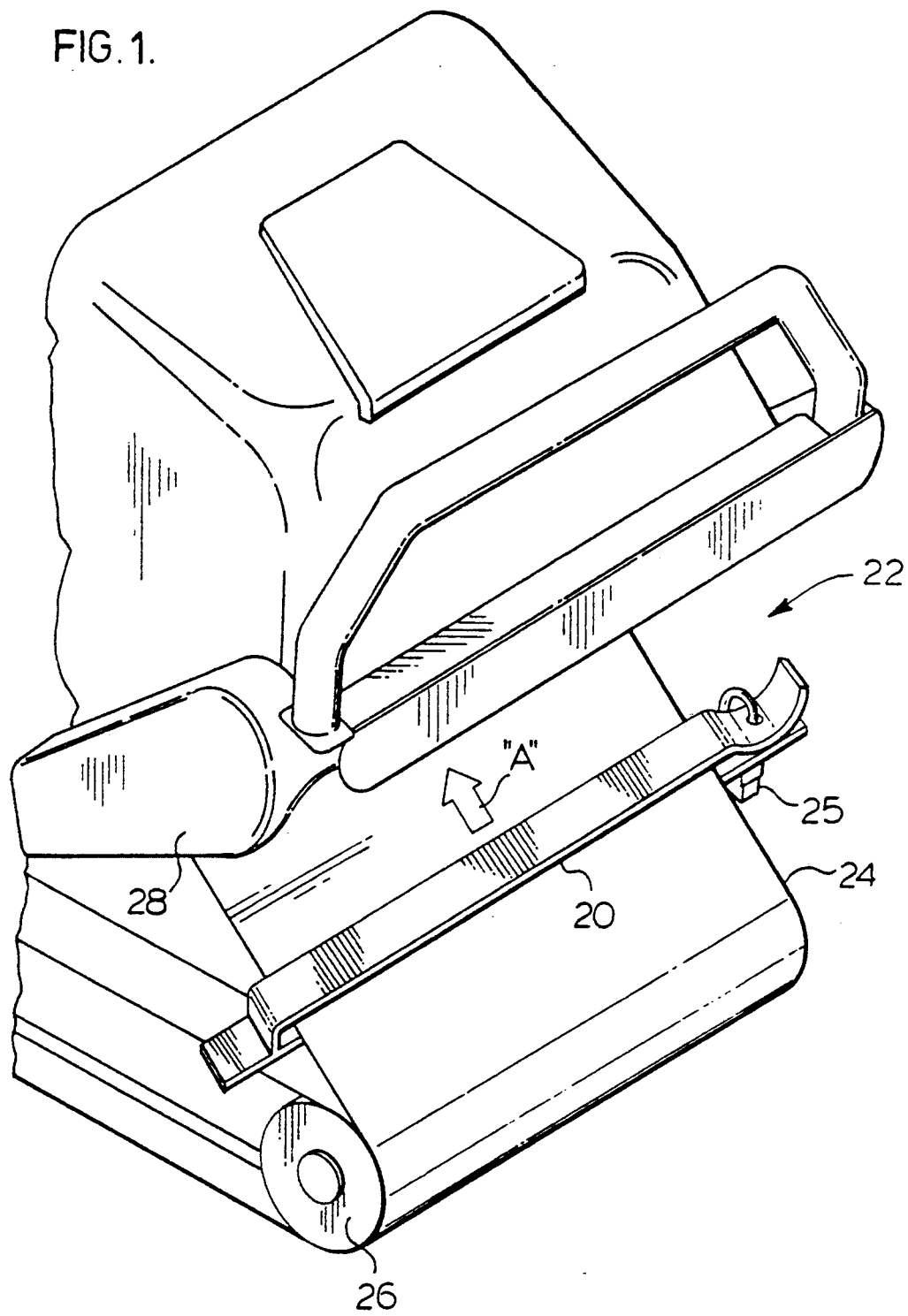
FIG. 1 is an isometric view from the left rear of a snowmobile with the device of the present invention engaged thereon.

Reference will now be made to FIG. 1, which shows the anti-theft device 20 of the present invention installed on a tracked snowmobile 22, and locked in place on the track 24 of the snowmobile 22 by lock 25. The device 20 is positioned between adjacent tread members (not shown) of the track 24 and cannot be slidably moved along the track 24. When the device 20 is in place on the track 24 of the snowmobile 22, and the snowmobile 22 is driven forwardly, the track 24 will move in the direction as indicated by arrow "A" around the driving mechanism (not shown) of the snowmobile 22, and around idler wheels 26. As the device 20 moves in the direction shown by arrow "A", it reaches a portion 28 of the body of the snowmobile 22, which stops the device 20 and thereby stops the movement of the track 24. In this manner, the snowmobile 22 is precluded from being driven.

Figure 2:
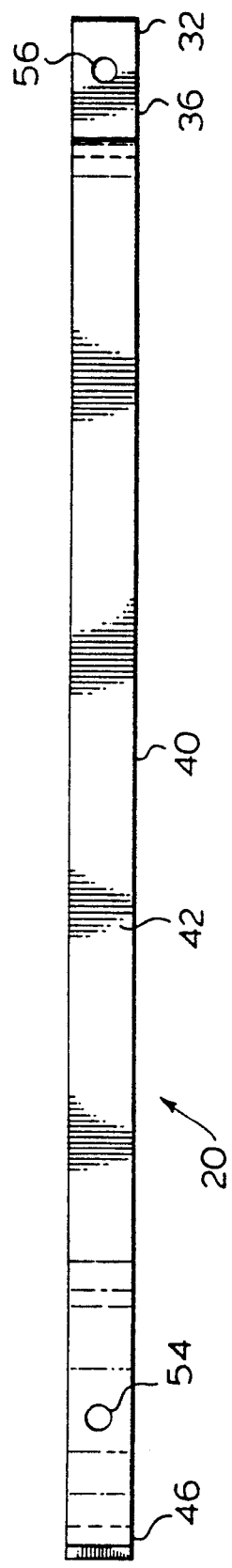
FIG. 2 is a top view of the device of FIG. 1.
Figure 3:
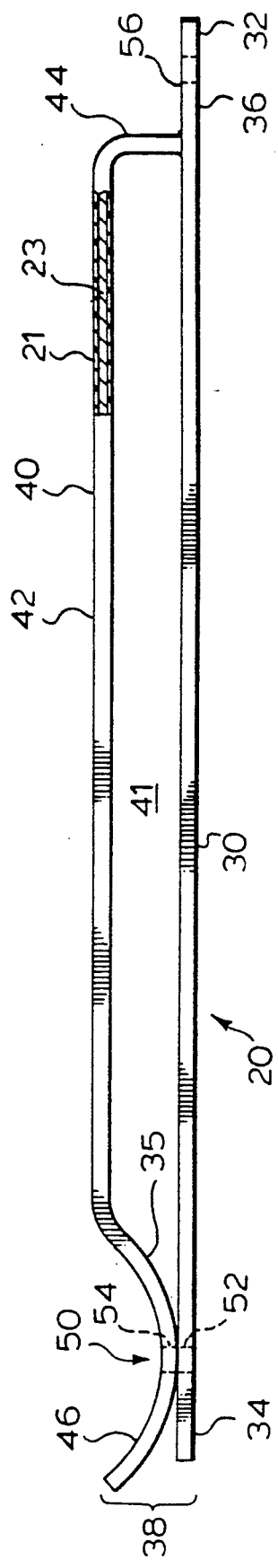
FIG. 3 is a side elevational view of the device shown in FIG. 1 in a closed and locked configuration, as it would be on the track of a snowmobile, with a portion of said device shown in cutaway.

Reference will now be made to FIGS. 2 and 3, to describe the parts of the device 20 in detail. The device 20 comprises an elongated main arm member 30 that has first and second generally opposed ends 32, 34. The main arm member is adapted to engage a portion of the track 24 of the tracked snowmobile 22, between adjacent tread members—generally, the slider guides—and is further adapted to extend across the width of the track 24. A first blocking means 36 is located at the first end 32 of the elongated main arm member 30, and in the preferred embodiment is an end portion of the elongated main arm member 30. There is also a second blocking means 38 located at the second end 34 of the elongated main arm member 30, and in the preferred embodiment is an end portion of the second end 34 of the elongated main arm member 30. The first and second blocking means 36,38 extend beyond the width of the track 24.

A retaining means 40 in the form of a substantially L-shaped auxiliary arm member 42, having a first end 44 and a second end 46 is securely attached to the elongated main arm member 30. The first end 44 of the auxiliary arm member 42 is welded near the first end 32 of the elongated main arm member 30. The auxiliary arm member 42 is connected to the elongated main arm member 30 so as to define a bight 41 therebetween. The track 24 has a drive surface facing inwardly and a tread surface facing outwardly, both of which are of a convoluted shape. At least one of these surfaces is suitable for receiving either one of the elongated main arm member 30 and the auxiliary arm member 42 such that the device 20 cannot slip along the length of the track. The track 24 will occupy the bight 41 which is surrounded by the arm members 30 and 42. The auxiliary arm member 42 extends substantially to the second end 34 of the elongated main arm member 30, and may extend beyond it. At the second end of the auxiliary arm member 42 there is formed a portion 35 that is curved downwardly to be juxtaposed to the elongated main arm member 30 near the second end 34 thereof. This curved portion 35 at the second end of the auxiliary arm member 42 also acts as a part of the second blocking means 38.

At the second end 34 of the elongated main arm member 30 there is a first co-operating aperture 52 and at the second end 46 of the auxiliary arm member 42 there is a second co-operating aperture 54. The first and second co-operating apertures 52, 54 are axially aligned with one another when the second end 46 of the auxiliary arm member 42 contacts the second end 34 of the elongated main arm member 30, and thereby form a lock receiving means 50. The lock 25, as shown in FIG. 1, hooks into the first and second cooperating apertures 52, 54 to lock the device 20 in place on the track 24 of the snowmobile 22. When the device 20 is locked in place onto the track 24 of the snowmobile 22, the first and second blocking means 36, 38 are adapted to physically engage a portion 28 of the body of the snowmobile 22 if the track 24 is moved with respect to the body of the snowmobile 22. In this manner, the tracked snowmobile 22 is thereby precluded from being driven more than a few inches.

There is an aperture 56 located at the first end 32 of the elongated main arm member 30, specifically in the first blocking means 36. The exact location of the aperture 56 is not overly important. The purpose of the aperture 56 is to allow the device 20 to be chained or cabled to a tree or the like, or to another similar anti-theft device installed on another snowmobile.

The device 20 is preferably made from hot rolled steel having relatively low stiffness characteristics. The device 20 must, however, be somewhat flexible so that the auxiliary arm member 42 can be separated at its second end 46 from the second end 34 of the elongated main arm member 30, for the purpose of putting the device 20 on the track 24 of a snowmobile 22. The device 20 is preferably coated with a thermally insulative plastic material 21 to preclude a person's fingers from becoming stuck to the cold metal material 23 during winter temperatures. The thermally insulative plastic material 21 may be introduced to the device 20 by well known manufacturing methods such as dipping or powder coating.

However, before the device 20 is coated with the plastic material 21, it is case hardened at least to a reasonable hardening depth. This precludes any likelihood that a hacksaw or other implement could be used to cut one of the arms 30 or 42, while not affecting the flexibility of those arms away from one another when the device is put in place on the snowmobile track 24.

It can be seen that the device 20 of the present invention fits very closely to the track 24 of the snowmobile 22. Resultingly, it is very difficult to physically access the device 20 in order to cut it and unwantedly remove it from the track 24. This readily contrasts to the use of a chain for chaining a snowmobile to a tree, wherein the length of the chain would be readily accessible for cutting.

In order to steal the snowmobile 22, it would be easier to either lift the snowmobile and haul it away, which is difficult, or to cut the lock 25, which is also case hardened. It can therefore be seen that the device 20 of the present invention fully serves its purpose.

Other modifications and alterations may be used in the design and manufacture of the snowmobile track lock of the present invention without departing from the spirit and scope of the accompanying claims.

What is claimed is:

1. A anti-theft device for use in conjunction with a tracked snowmobile, said device comprising:
    an elongated main arm member having first and second generally opposed ends, said main arm member being adapted to extend substantially across the width of said track
    a first blocking means at said first end of said elongated main arm member;
    a second blocking means at said second end of said elongated main arm member;
    retaining means connected to said elongated main arm member;
    lock receiving means adapted to accept a lock means that locks said retaining means with respect to said elongated main arm member, and thereby locks said elongated main arm member in engagement with said track;
    wherein said elongated main arm member and said retaining means define a bight therebetween for receiving at least a portion of said track of said tracked snowmobile, and one of said elongated main arm member and said retaining means are adapted to engage a portion of said track so as to substantially preclude movement of said device along said track; and
    wherein said first and second blocking means are adapted to physically engage a portion of the body of said tracked snowmobile so as to substantially preclude relative movement of said track with respect to said portion of said body, thereby to preclude said tracked snowmobile from being driven.

2. The device of claim 1, wherein said retaining means is an auxiliary arm member having a first end and a second end.

3. The device of claim 2, wherein said auxiliary arm member is substantially L-shaped and is connected to said elongated main arm member near said first end thereof.

4. The device of claim 3, wherein said auxiliary arm member extends substantially to the second end of said elongated main arm member.

5. The device of claim 4, wherein said auxiliary arm member is securely attached to said elongated main arm member.

6. The device of claim 5, wherein said auxiliary arm member is welded to said elongated main arm member.

7. The device of claim 6, wherein said first blocking means is an end portion of said elongated main arm member.

8. The device of claim 7, wherein said second blocking means is an end portion of one of said elongated main arm member and said auxiliary arm member.

9. The device of claim 8, wherein said elongated main arm member and said auxiliary arm member are each substantially straight.

10. The device of claim 9, wherein said second end of said auxiliary arm member is formed such that a portion thereof is juxtaposed the elongated main arm member near said second end thereof.

11. The device of claim 10, wherein said lock receiving means is located at said second end of said elongated main arm member and said auxiliary arm member.

12. The device of claim 11, wherein said lock receiving means comprises first and second co-operating apertures, one in each of said elongated main arm member and said auxiliary arm member.

13. The device of claim 12, wherein said device is made from hot rolled steel having relatively low stiffness characteristics.

14. The device of claim 13, wherein said device is coated with thermally insulative plastic material.

15. The device of claim 13, wherein the steel of said device is case hardened.

* * * * *